US012726038B2

(12) United States Patent
D'Amico et al.

(10) Patent No.: US 12,726,038 B2
(45) Date of Patent: *Sep. 1, 2026

(54) SYSTEMS, APPARATUSES AND METHODS FOR APPLIANCES WITH INTEGRATED ENERGY STORAGE

(71) Applicant: Impulse Labs, Inc., San Francisco, CA (US)

(72) Inventors: Samuel Redmond D'Amico, San Francisco, CA (US); Samuel William Lenius, Palo Alto, CA (US); Bradley James Tallon, Los Angeles, CA (US); Deanna James Chang, New York, NY (US); Brian H. Sharp, San Francisco, CA (US)

(73) Assignee: Impulse Labs, Inc., San Francisco, CA (US)

( * ) Notice: Subject to any disclaimer, the term of this patent is extended or adjusted under 35 U.S.C. 154(b) by 746 days.

This patent is subject to a terminal disclaimer.

(21) Appl. No.: 18/095,817

(22) Filed: Jan. 11, 2023

(65) Prior Publication Data

US 2023/0238819 A1 Jul. 27, 2023

Related U.S. Application Data

(60) Provisional application No. 63/301,861, filed on Jan. 21, 2022.

(51) Int. Cl.
*H02J 7/92* (2026.01)
*G06F 1/26* (2006.01)
(Continued)

(52) U.S. Cl.
CPC ................ *H02J 7/92* (2026.01); *G06F 1/263* (2013.01); *H02J 7/04* (2013.01); *H02J 7/40* (2026.01);
(Continued)

(58) Field of Classification Search
CPC .... H02J 7/0071; H02J 7/00032; H02J 7/0013; H02J 7/04
(Continued)

(56) References Cited

U.S. PATENT DOCUMENTS

| | | | | |
|---|---|---|---|---|
| 10,666,047 | B2 | 5/2020 | Zubieta | |
| 10,996,735 | B2 * | 5/2021 | Scalf | H04L 12/2803 |

(Continued)

FOREIGN PATENT DOCUMENTS

| | | | |
|---|---|---|---|
| EP | 3846304 | A1 | 7/2021 |
| JP | 2013201819 | A | 10/2013 |

(Continued)

OTHER PUBLICATIONS

Written Opinion and International Search Report for International Patent Application No. PCT/US23/60456, dated Jun. 14, 2023 (11 pages).

(Continued)

*Primary Examiner* — Suchin Parihar

(57) ABSTRACT

An intelligent energy system includes an energy-consuming appliance, a battery module coupled to the appliance, and a bidirectional converter coupled to the appliance and the battery module by a power bus. The battery module is configured to provide power to the appliance. The bidirectional converter converts between alternating current (AC) and direct current (DC) and interfaces with a power infrastructure external to the appliance. The system further includes a control unit communicatively coupled to the battery module, the bidirectional converter, and the appliance. The control unit is configured to determine a charge and discharge schedule for the battery module. The battery module coupled with the bidirectional converter provides uninterrupted power to the appliance, abstracts the power demands of the appliance from local power infrastructure,
(Continued)

and allows for greater appliance peak power draw than would otherwise be practical or possible.

25 Claims, 7 Drawing Sheets

(51) Int. Cl.
*H02J 3/32* (2026.01)
*H02J 7/00* (2026.01)
*H02J 7/04* (2006.01)
*H02J 7/40* (2026.01)
*H02J 7/50* (2026.01)
*H02J 7/90* (2026.01)

(52) U.S. Cl.
CPC ................ *H02J 7/50* (2026.01); *H02J 7/855* (2026.01); *H02J 7/933* (2026.01); *H02J 3/32* (2013.01); *H02J 2207/20* (2020.01)

(58) Field of Classification Search
USPC .......................................................... 320/128
See application file for complete search history.

(56) References Cited

U.S. PATENT DOCUMENTS 11,394,247 B1* 7/2022 Tsibulevskiy ............. H02J 7/06
11,735,919 B2* 8/2023 Cruickshank, III ...... H02J 9/06 700/295
2004/0135545 A1 7/2004 Fowler et al.
2010/0076615 A1* 3/2010 Daniel ...................... G05F 1/66 703/2
2010/0219688 A1 9/2010 Shyu et al.
2013/0234669 A1 9/2013 Huang et al.
2013/0344204 A1 12/2013 Goodson
2014/0020244 A1 1/2014 Carlson et al.
2015/0005900 A1* 1/2015 Steele ................ G05B 19/0426 700/19
2015/0066228 A1* 3/2015 Clifton .............. H02J 13/00004 700/295
2015/0108839 A1* 4/2015 Annavajjhala ........ H02J 7/0029 29/825
2016/0344204 A1 11/2016 Steffes et al.
2018/0353039 A1 12/2018 Erkek et al.
2019/0283695 A1 9/2019 Schumacher et al.
2020/0259360 A1 8/2020 Tagawa et al.
2021/0021138 A1 1/2021 Yang et al.
2021/0296897 A1 9/2021 Cruickshank, III
2022/0115884 A1 4/2022 Wang et al.
2022/0344941 A1* 10/2022 Griffith ..................... H02J 3/32
2022/0380564 A1* 12/2022 Kakinuma ............... C08J 7/123
2023/0420956 A1 12/2023 Wu et al.
2024/0006882 A1* 1/2024 Donahue ................. H02J 3/381
2024/0195199 A1 6/2024 D'Amico et al.
2025/0117756 A1* 4/2025 Cardona ............ G06Q 30/0631

FOREIGN PATENT DOCUMENTS

KR 20140039511 A 4/2014
KR 20140124974 A 10/2014
WO WO-2023141383 A1 7/2023

OTHER PUBLICATIONS

EP Application No. 23743836.1, Extended European Search Report mailed Jan. 19, 2026; Applicant Impulse Labs, Inc.; 10 pages.
PCT Application No. PCT/US2023/060456, International Preliminary Report on Patentability dated Jul. 23, 2024; Applicant Impulse Labs, Inc.; 9 pages.
U.S. Appl. No. 18/424,557, Final Office Action dated Jan. 24, 2025; Inventor D'Amico, Samuel Redmond et al.; 11 pages.
U.S. Appl. No. 18/424,557, Non-Final Office Action dated Aug. 6, 2025; Inventor D'Amico, Samuel Redmond et al.; 11 pages.
U.S. Appl. No. 18/424,557, Non-Final Office Action dated May 22, 2024; Inventor D'Amico, Samuel Redmond et al.; 9 pages.
U.S. Appl. No. 18/424,557, Non-Final Office Action dated Sep. 16, 2024; Inventor D'Amico, Samuel Redmond et al.; 8 pages.
IN Application No. 202417062735, Examination Report mailed May 11, 2026, Applicant: Impulse Labs, Inc., 10 pages. [English Translation included].
U.S. Appl. No. 18/424,557, Notice of Allowance mailed Apr. 14, 2026, Inventor: D'Amico et al., 12 pages.

* cited by examiner

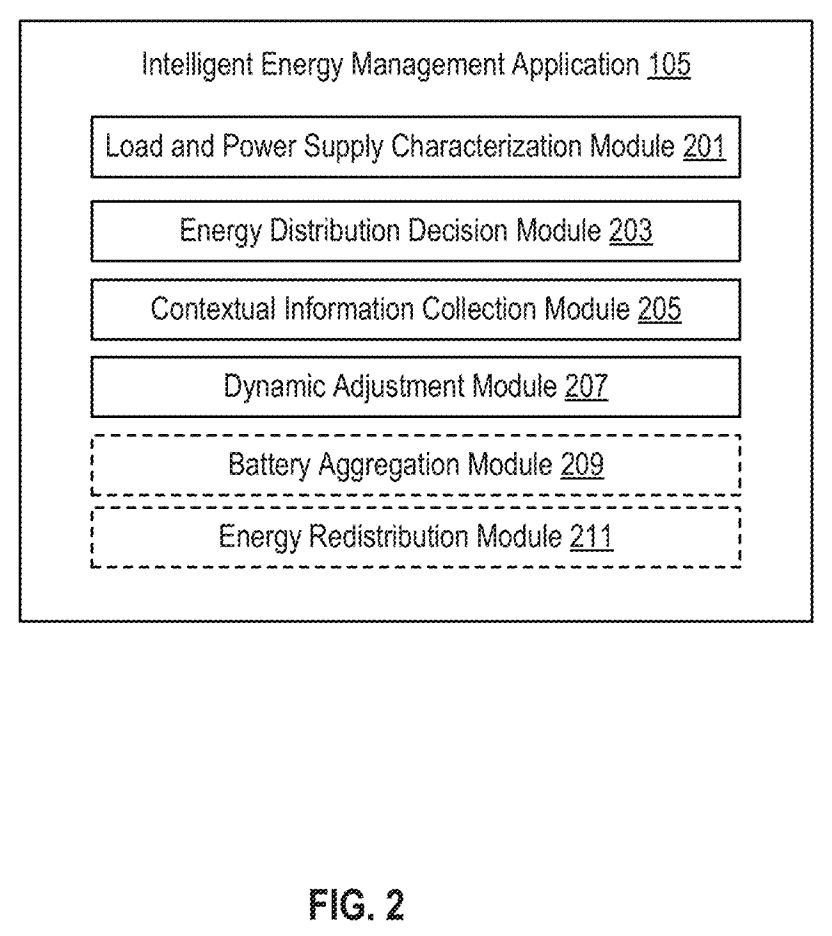

Intelligent Energy Management Application 105

Load and Power Supply Characterization Module 201

Energy Distribution Decision Module 203

Contextual Information Collection Module 205

Dynamic Adjustment Module 207

Battery Aggregation Module 209

Energy Redistribution Module 211

FIG. 2

SYSTEMS, APPARATUSES AND METHODS FOR APPLIANCES WITH INTEGRATED ENERGY STORAGE

CROSS REFERENCE TO RELATED APPLICATION

This application claims the benefit of and priority to U.S. Provisional Patent Application No. 63/301,861 filed Jan. 21, 2022, the entire disclosure of which is hereby incorporated by reference in its entirety for all purposes.

TECHNICAL FIELD

The disclosure generally relates to energy storage and, more particularly, to systems, apparatus, and methods for an optimized charge or discharge of energy storage devices for increased availability of peak power and sharing of stored energy across multiple appliances or electricity-powered units.

BACKGROUND

Distribution, consumption, or conversion of electric energy in buildings, such as residences, commercial buildings, industrial facilities, and non-building environments (e.g., agricultural, industrial, medical, and transport systems) rely on available incoming power as the basis for distributing electricity. For example, if a user wants to purchase and install an appliance (e.g., a dryer) that is powered by electricity, the appliance may be required to have the necessary electrical infrastructure, such as a specialized, high current 220 V line and/or plug. Substantial expense and effort may be then required to install these specialized lines and/or plugs. In addition, the location where such appliances can be located is also limited due to these requirements. Similarly, if a user wishes to charge an electric vehicle, it may be necessary to add a specialized 220 V line and a specialized plug. A range, stove, or cooktop may face similar concerns due to its special power requirements.

During periods of electric grid unavailability, users of electrical power have limited options. For example, a user may purchase an electrical generator that is fueled by gasoline or natural gas. Additionally or alternatively, a user may also retrofit, reinstall, or upgrade the electrical panel to include a power storage device, such as a fixed installation battery system. However, such approaches require substantial expense and dedicated space and are limited to providing power for a unit based on the available power from the generator or fixed installation battery system. Further, the backup electricity options are limited by other factors, e.g., usage of other appliances at home, appropriate in-home/in-building electric infrastructure sizing methodologies, or limited by conditions such as when a generator runs out of fuel.

Additional limitations include, but are not limited to, that the heat and/or energy available during times of peak load is generally limited by the available power of the grid connection and may further be limited by infrastructure. The peak available power to the appliance is thus limited by existing shared and private infrastructure. For example, it's impractical (or based on standards might well be impossible) for a single appliance to pull 20 kW due to branch circuit sizing limitations. It may similarly be impractical to have several appliances in a home with peak power draws that are lower (e.g., 15 kW) because there are not only branch circuit limitations but also may have certain panel and feed limitations. This can lead to performance limitations. For example, users may experience long cooking/boiling time and/or inability to cook certain types of food with a range or cooktop, users may have to wait for water to be heated for washing clothes or dishes, bathing, or the like. All of these may draw additional costs on energy and water and undesired performance of these appliances.

In addition, in an era of decarbonization, where there is a strong focus on technologies and approaches which may limit the planet from warming more than 1.5° C. above pre-industrial levels, most countries, including the U.S., have set goals to reach net zero by 2050. Net zero means that all greenhouse gas emissions produced are counterbalanced by an equal amount of emissions that are eliminated or captured. Achieving this will require shifting away from the greenhouse gas emissions produced by fossil fuels, for example, by using renewable energy. While renewable energy is plentiful in the right conditions, it is intermittent. For example, solar panels in residential units may not generate energy at moments (e.g., early morning or evening) when demand is high. Accordingly, additional objectives of decarbonization include an increase in efficiency in energy transmission, storage, distribution, and conversion at the point of use.

Accordingly, there is an unmet need for effective approaches for electricity to be distributed within specific residential, industrial, or commercial settings more efficiently and intelligently.

SUMMARY

To address the aforementioned shortcomings, systems and methods for intelligent energy management are provided. An example method includes an appliance, a battery module coupled to the appliance, and a bidirectional converter coupled to the appliance and the battery module by a power bus. The battery module is configured to provide power to the appliance. The directional converter converts between alternating current (AC) and direct current (DC) and interfaces with a power infrastructure external to the appliance. The systems and methods further include a control unit communicatively coupled to the battery module, the bidirectional converter, and the appliance. The control unit is configured to determine an optimized charge and discharge schedule for the battery module.

The foregoing is a summary and thus contains, by necessity, simplifications, generalizations and omissions of detail; consequently, the summary is illustrative only and is not limiting in any way. Other aspects, inventive features, and advantages of the systems and/or processes described herein will become apparent in the non-limiting detailed description set forth herein.

BRIEF DESCRIPTION OF THE DRAWINGS

The disclosed implementations have advantages and features which will be more readily apparent from the detailed description, the appended claims, and the accompanying figures (or drawings). A brief introduction of the figures is below.

FIG. 2 illustrates a block diagram of example modules included in an intelligent energy management application, according to some implementations.

DETAILED DESCRIPTION

Figure 1:
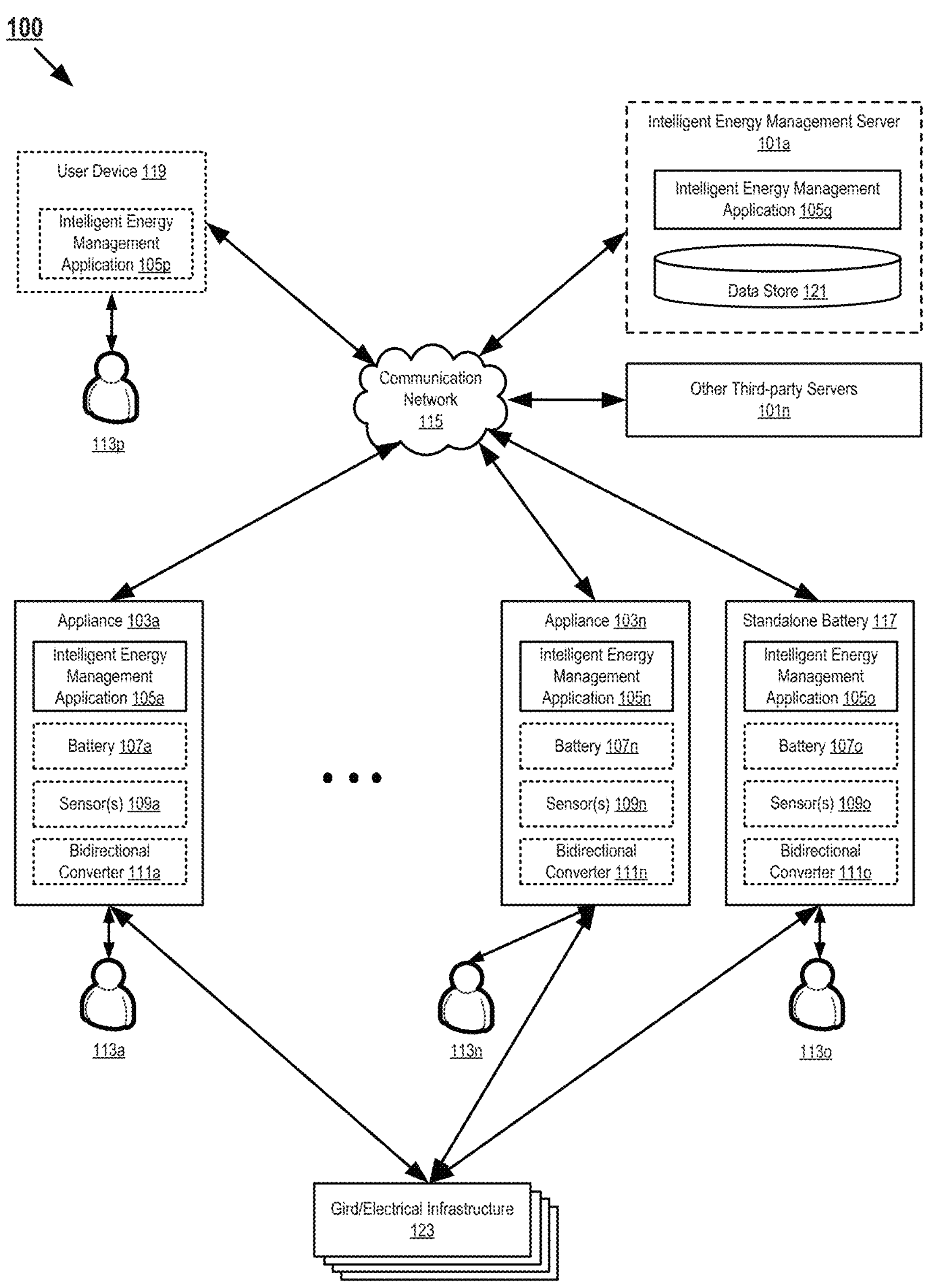
FIG. 1 illustrates a block diagram of an exemplary system architecture for intelligent energy management, according to some implementations.

In the following detailed description of implementations, reference is made to the accompanying drawings which form a part hereof, and which are shown by way of illustrations. It is to be understood that features of various described implementations may be combined, other implementations may be utilized, and structural changes may be made without departing from the spirit and scope of the present disclosure. It is also to be understood that features of the various implementations and examples herein can be combined, exchanged, or removed without departing from the spirit and scope of the present disclosure. In addition, reference numerals and descriptions of redundant elements between figures may be omitted for clarity.

According to some implementations, the methods and functions described herein, such as controlling battery charge or discharge, may be implemented as one or more software programs running on a computer processor (e.g., a control unit or controller). According to some implementations, the methods and functions described herein may be implemented as one or more software programs or firmware programs running on a standalone computing device or embedded apparatus, such as a tablet computer, smartphone, personal computer, server, or any other computing device, or on an appliance or apparatus with a controlling program. Dedicated hardware implementations including, but not limited to, application-specific integrated circuits, programmable logic arrays, and other hardware devices can likewise be constructed to implement the methods and functions described herein. Further, the methods described herein may be implemented as a device, such as a non-transitory computer-readable storage medium or memory device, including instructions that when executed cause a processor to perform the methods and functions described herein.

According to some implementations, the methods, systems, and apparatuses disclosed herein may relate to an energy storage device (e.g., a battery module) for single or multiple appliances, apparatuses, or electricity-powered units. The energy storage device may reside internally or externally to an appliance, apparatus, or electricity-powered unit, and may be smartly charged and discharged to provide proper power to directly coupled appliance(s), apparatus(es), or electricity-powered unit(s) itself or to other indirectly connected appliances, apparatuses, or electricity-powered units. For example, the methods and functions described herein, when implemented as software or firmware programs, may provide a control mechanism that optimizes the charge or discharge of an energy storage device during periods of peak power consumption, high transient energy pricing, and/or during power outages. According to some implementations, the methods, systems, and apparatuses disclosed herein can be applied to a residential, industrial, or commercial setting for appliances or any other system that has electric power as an input and optically have energy in various forms as an output.

According to some implementations, the methods, systems, and apparatuses disclosed herein may provide various benefits and advantages. For example, but not by way of limitation, implementations disclosed herein may provide a functional equivalent of a 220 V, 50 A (or even higher or lower value) outlet under the environment of an existing 110 V electrical infrastructure, without having to install a new 220 V power delivery infrastructure (e.g., specialized lines and/or plugs). This then saves the cost and effects of installation or retrofit of 220 V power delivery infrastructure. In addition, implementations disclosed herein may also provide energy storage in a battery module that allows an internal (or external) storage of energy within (or outside) an appliance, apparatus, or electricity-powered unit. As a result, implementations disclosed herein can permit the usage of electricity in a manner that bypasses the limitations of existing electrical infrastructure such as a branch circuit, circuit breaker, 100 A panel, or the like. For example, implementations disclosed herein may allow an appliance to be movable or portable. Further, the implementations disclosed herein may also allow, during periods of power loss, electric power that is stored in the battery module within an appliance (or outside an appliance) to be redirected, to provide backup power for the appliance itself and for additional appliances (e.g., appliances in the same room, house, facility, building, etc.). For example, if a power outage occurs in the middle of the night when kitchen appliances are less likely to be used but a home is more likely to need to be heated, the power stored in the battery module from the kitchen appliance(s) may be provided as electric power for running space heaters or other electrical furnaces, without interfering with the operation of the kitchen appliance(s).

It is to be understood that the features, benefits, and advantages described herein are not all-inclusive, and many additional features and advantages will be apparent to one of ordinary skill in the art in view of the figures and the following descriptions.

Overview of Intelligent Energy Management System

As used herein, the terms "energy" and "power" are to be interpreted according to their broad and ordinary meanings and may refer to any form of power resources and/or their converted forms (e.g., electricity generated from gas, charcoal, hydropower or hydrokinetic, wind, solar, biomass, geothermal, etc.) for driving an electrical appliance, apparatus, or other electricity-powered devices to operate as expected. The term "battery module" is used herein according to its broad and ordinary meaning and may refer to any type of battery cell (the smallest unit of a battery) or modules organized in series and parallel in a single pack for charge from a resource and for discharge to an appliance, apparatus, or any other electricity-powered unit.

FIG. 1 illustrates a block diagram of an example intelligent energy management architecture 100, according to some implementations of the disclosure. As illustrated, an intelligent energy management system 100 may include distributed appliances 103*a*-103*n* (collectively or individually referred to as appliance 103) and a server environment comprising one or more servers, including but not limited to an intelligent energy management server 101*a* and/or one or more third-party servers 101*n*. One or more appliances 103 may be coupled to a battery module 107*a* or 107*n* (collectively or individually referred to as battery module 107), and may include an intelligent energy management application 105*a*-105*n* (collectively or individually referred to as intelligent energy management application 105) for managing the coupled battery module 107. Each battery module 107 may be installed inside or outside an appliance and may include a coupled bidirectional converter 111*a* or 111*n* (collectively or individually referred to as bidirectional converter 111) for the charge or discharge of the battery. In some implementations, a storage battery may be not directly coupled to a specific appliance, but rather can provide electricity to multiple different appliances, and thus can be referred to as a standalone battery 117. Also included in the intelligent energy management system 100 are a communication network 115 for setting up communications between different components of the system and a grid/electrical infrastructure 123 for electricity transmission between components within the system or with outside source(s). In some implementations, the intelligent energy management system 100 may optionally include a user device 119 configured to communicate with one or more appliances 103 and/or server 101 (e.g., for remote control one or more appliances or battery modules coupled to the appliances).

It is to be noted that the scale of intelligent energy management system 100 may vary and may include additional or fewer components than those illustrated in FIG. 1. In one example, in its basic form, an intelligent energy management system 100 may include only one appliance 103 without necessarily including servers 101 and/or client devices 119. In another example, there may be additional sensors 109*a*-109*n* (collectively or individually referred to as sensor 109) included in the intelligent energy management system 100. In addition, in some implementations, interfacing between components of the intelligent energy management system 100 may occur remotely, for example, where the components of the intelligent energy management system 100 may be distributed across one or more devices of a distributed network. For example, one user device 119 or server 101 may be configured to manage a plurality of appliances in remote locations (or through remote control) through distributed intelligent energy management applications 105.

Appliance 103 may be specifically configured to include a storage battery module 107 directly coupled to the appliance, e.g., by integrating into, embedding into, or attaching to the appliance. Examples of such appliances may include but are not limited to, certain heating, cooling, and climate control equipment (e.g., central air conditioner, window air conditioner, space heater, electric water heater, dehumidifier, fan, air purifier, and the like), kitchen appliances (e.g., electric range, microwave, stove, oven, refrigerator, coffer maker, toaster, blender, dishwasher, stovetop burner, hotpot, teapot and the like), lighting, miscellaneous entertaining electronic devices (e.g., television, audio receiver, gaming console, and the like), and other appliances such as clothing dryers, hairdryers, or any other apparatus or electricity-powered unit that may have high peak electrical power requirements for a residential, commercial, or industrial application.

Battery module 107 is a type of electrical battery that can be charged, discharged into a load, and recharged many times, as opposed to a disposable or primary battery. The battery module 107 may be composed of one or more electrochemical cells. The rechargeable batteries can be in many different shapes and sizes, ranging from button cells to megawatt systems connected to stabilize an electrical distribution network. In some implementations, a battery module 107 may be designed to have a size and shape fitting into a specific appliance 103. In some implementations, different combinations of electrode materials and electrolytes can be used for the battery module 107, which include, but are not limited to, lead-acid, zinc-air, nickel-cadmium (NiCd), nickel-metal hydride (NiMH), lithium-ion (Li-ion), lithium iron phosphate ($LiFePO_4$), and lithium-ion polymer (Li-ion polymer). In some implementations, a battery module 107 disposed inside or outside an appliance 103 is also replaceable. That is, a battery module 107 can be easily replaced (e.g., by dragging out/pushing in) without necessarily affecting the function of a coupled appliance 103.

Bidirectional converter 111 may convert alternating current (AC) to direct current (DC) in the direction from a power source (e.g., from grid/electrical infrastructure 123) to the battery module 107, and from DC to AC in the direction from the battery module 107 to the power source or a directly connected load requiring AC power (e.g., a refrigerator directly connected to a cooktop containing the battery and bidirectional converter). In some implementations, the power source is a 110 V power supply. In some implementations, the power source can be a 220 V power supply, depending on the grid structure used by the suppliers (e.g., in some Eastern countries). In addition, the DC output provided by the converter can be also at a different scale. For example, the output can be 6 V, 12 V, 24 V, or any other proper voltage depending on the appliance that the bidirectional converter is coupled to. In some implementations, the bidirectional converter 111 includes more than one converter. For example, the bidirectional converter 111 may include a first AC-DC converter for a 110 V power supply and a second AC-DC converter for a 220 V power supply. For another example, the bidirectional converter 111 may include a first converter to output a 6 V electric power, and a second converter to output a 12 V electric power. In some implementations, the bidirectional converter 111 may include a DC-DC converter with or without including an AC-DC converter. In some implementations, the bidirectional converter may automatically configure itself to accept a range of AC and DC voltages.

The grid/electrical infrastructure 123 may provide power to a battery module 107 through a coupled bidirectional converter 111. The grid/electrical infrastructure 123 may be provided from existing electrical infrastructure (e.g., an electric grid inside a building or set of buildings, also referred to as grid power, fixed power, or fixed alternating current). In one example, an existing circuit containing a circuit breaker element with a 20 A limit (whether it is on 110 V or 220 V) may provide the power input to the bidirectional converter. In some implementations, such as in an industrial setting, an existing circuit may include any voltage level or any number of phases such as a 3-phase 480 V configuration. In some implementations, the power source may alternatively be a DC source, such as a current from a solar panel, a local DC power generator (e.g., gas generator), and the like.

Sensors 109 may include any number of sensors and/or any types of sensors configured to collect information from the surrounding environment or system. In one example, the sensors 109 may include, but are not limited to, an image sensor, video sensor, audio sensor, temperature sensor, humility sensor, light detection sensor, different weather sensors (e.g., wind direction sensor, wind direction sensor, rain gauge, UV sensor, sunlight sensor, solar radiation sensor, air pressure sensor, noise sensor, rain/snow sensor, evaporation sensor, etc.) and the like. These different sensors may be locally (e.g., an on-board temperature sensor) or remotely coupled to an appliance and/or power source, and may provide certain contextual information to an appliance 103, for example, to an intelligent energy management application 105 of the appliance. In some implementations, each sensor 109 may further include a signal processing unit configured to process the signal detected by the sensor. For example, based on the configured complexity, an audio sensor may be configured to identify text from an audio, a person's likely age (e.g., a baby or elder person), a temper of a person in an audio file, and the like. If more than one person is included in an audio file, such information may be identified for each person. For another example, based on the configured complexity, a video sensor coupled to a cooktop may be configured to monitor a cooking process, including obtaining images of the food being cooked. In another example, based on the configured complexity, an image sensor coupled to a storage portion of a refrigerator may be configured to detect types and numbers of food (e.g., how many eggs, how many vegetables, what types of vegetables, and so on) stored in a refrigerator. In some implementations, there may be other different sensors as described later.

In some implementations, the intelligent energy management system 100 may optionally include a client device 119 configured to communicate with one or more appliances 103 and/or server 101. For example, through an instance of intelligent energy management application 105*p* installed on the client device 119, a user may check the power level of a storage battery, and configure certain parameters of the battery, such as preferred charge time, a preferred appliance for discharge, etc. In some implementations, such configuration information may be directly transmitted to an appliance 103, a standalone battery 117, or a server 101 through the communication network 115.

In some implementations, another instance of intelligent energy management application 105*p* may reside on a single server 101*a* or may be spread across multiple servers (not shown) as desired or practical. The intelligent energy management server 101*a* may be implemented according to executable code and/or associated server components used to support computing on server 101*a*.

In some implementations, intelligent energy management server 101*a* may be a cloud server that possesses larger computing/communication capabilities and computing resources than an appliance 103, and therefore may perform more complex computations or communications than an appliance 103 can. For example, a complicated decision process for automatically determining an ideal daily schedule for charge and/or dynamically adjusting a power level provided from a battery module 107 to a coupled appliance 103 may be implemented in the instance of the intelligent energy management application 105*p* on the intelligent energy management server 101*a*, while a receiving of user input to manually set up a charge or discharge task may be implemented in the instance of the intelligent energy management application 105*a* or 105*n* on an appliance 103. For another example, the intelligent energy management application 105*p* may automatically communicate with one or more sensors to collect instant contextual information so as determine whether to timely start, stop, or adjust the power supplied to an appliance. In some implementations, the intelligent energy management server 101*a* and the intelligent energy management application 105*p* may include additional functions and components, as described more in detail in FIG. 2. In some implementations, partial or full functions of an intelligent energy management application 105*p* can be released to an intelligent energy management application residing in a specific appliance. In some implementations, the intelligent energy management application 105*p* may be provided via a software-as-a-service (SaaS) platform.

In some implementations, an additional data storage unit may be coupled to server 101*a* locally (e.g., data store 121 illustrated in FIG. 1) or remotely (not shown). The data store 121 may include one or more non-transitory computer-readable media, and may collectively comprise logical data, executable code, instructions, and/or associated components to support storage, data management, and retrieval of data related to the energy management. The energy management-related data may include appliance data (model, type, manufacture, dates of services, etc.), storage battery data (e.g., size, power level, number of units, etc.), bidirectional converter data (e.g., input/output types, number of units, etc.), user profiles (e.g., user age, household size, etc.), user preferences (e.g., shower water temperature, shower time, washing machine loading cycle, etc.) with respect to certain appliances, weather data, recipes for a certain cooktop, characteristics (e.g. grabbing raw performance and command data to profile use over time), or any other data related to intelligent energy management. In some implementations, the energy management-related data may also include operating data of the components included in the system, which includes settings, states, levels, and the like related to the battery, loads, and so on. In some implementations, the collected and/or stored data may be transmitted to the server and used by the server for intelligent management. For example, the data-based intelligent management may be applied to the supply side (e.g., to optimize charging for battery life or cost) or to the demand side (e.g., to plan for a common use case that a user hasn't explicitly commanded) for performance improvement and optimization.

Third-party servers 101*n* may provide additional services to the intelligent energy management server 101*a*, or the services may be provided directly to the appliances 103. The third-party servers 101*n* may be provided using other logical server instances or included inside the intelligent energy management server 101*a* according to some implementations. The server features and provided services may relate to the intelligent decision-making process and/or other context-driven services. Examples of other server services may include but are not limited to, weather forecast service, power outage maps, alert service, instant recipes, and other information delivery, etc.

In some implementations, the intelligent energy management server 101*a* may be further configured to facilitate information communication between the appliances 103, standalone battery 117, client device 119, and possibly other third-party servers (s) 101*n*. For example, appliances 103 may exchange calendar information via the intelligent energy management server 101*a* over the communication network 115, directly between appliances 103 via the communication network 115, and/or through direct device-to-device information exchange, such as over a local pairing or network connection (e.g., Bluetooth, near-field communication, infrared, powerline networking, etc.).

Communication network 115 may be a conventional type, wired and/or wireless, and may have numerous different configurations, including a star configuration, token ring configuration, or other configurations. For instance, the communication network 115 may include one or more local area networks (LAN), wide area networks (WAN) (e.g., the Internet), public networks, private networks, virtual networks, mesh networks, peer-to-peer networks, and/or other interconnected data paths across which multiple devices may communicate. The communication network 115 may also be coupled to or include portions of a telecommunications network for sending data in a variety of different communication protocols. In some implementations, the communication network 115 includes Bluetooth communication networks or a cellular communications network for sending and receiving data including via short messaging service (SMS), multimedia messaging service (MMS), hypertext transfer protocol (HTTP), direct data connection, wireless application protocol (WAP), email, etc. In some implementations, during data transmissions, certain security mechanisms may be implemented in the communication network 115, to ensure no user information is leaked during data transmission between different components of the intelligent management system 100.

In some implementations, the intelligent energy management system 100 may include additional or fewer components than those illustrated in FIG. 1. For example, the intelligent energy management system 100 may additionally include a power bus for connecting different components included in the system.

Intelligent Energy Management Application

FIG. 2 illustrates example modules included in an intelligent energy management application 105, which can be an application residing in any of the appliances **103*a*-103*n*, standalone battery 117, user device 119, or intelligent energy management server 101*a*. According to one implementation, an intelligent energy management application 105 may include a load and power supply characterization module 201, an energy distribution decision module 203*a*, a contextual information collection module 205, and a dynamic adjustment module 207. In some implementations, when multiple battery modules are shared among different appliances and/or different residential units, a battery aggregation module 209 and an energy redistribution module 211 may be further included in an intelligent energy management application 105**.

Load and power supply characterization module 201 may be configured to characterize how the input energy is supplied (e.g., identifying a power supply pattern) and how appliances or related loads consume electric power (e.g., identifying a power consumption pattern). In some implementations, the intelligent energy management system 100 may optionally include an infrastructure configured to gather data from household loads. For example, there may be one or more sensors for monitoring the electricity usage of each appliance. Such sensors may include certain current transducer sensors configured to monitor electricity usage for large loads wired to dedicated circuits, such as air conditioners, washing machines, dryers, dishwashers, refrigerators, and the like. These sensors may connect to in-panel meters and sample pre-circuit electricity usage each second. In some implementations, these sensors may be configured to turn on only at a certain time period, e.g., at a data-gathering stage for pattern identification, and turn off after the data-collection stage ends to save energy.

Figure 3:
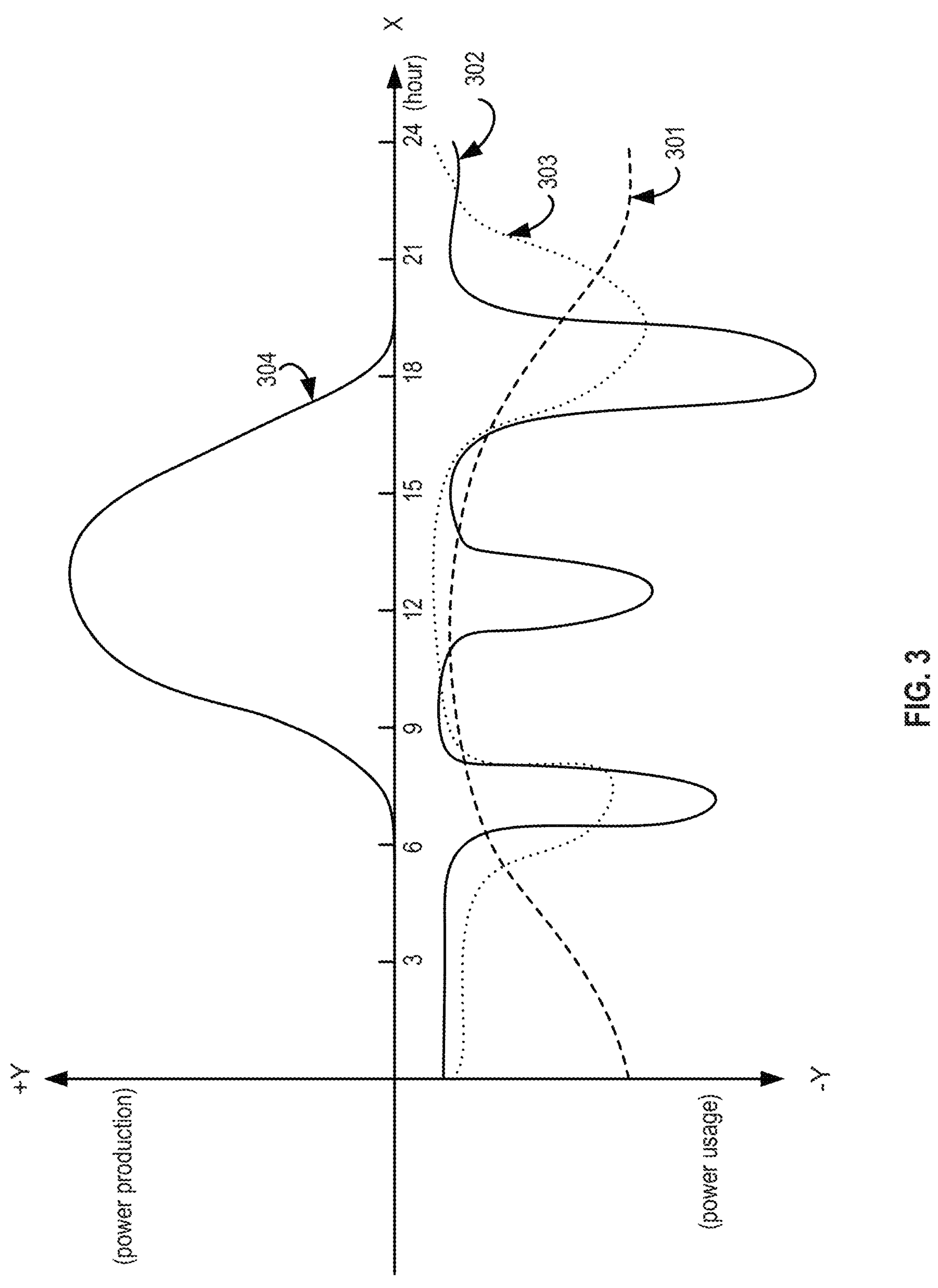
FIG. 3 is a plot illustrating example power usage patterns of appliances, power production pattern of a power supply, and charge and discharge schedule of a battery molecule, according to some implementations.

In some implementations, the load and power supply characterization module 201 may be configured to further identify the pattern of electricity usage for each appliance based on the gathered data. For example, the load and power supply characterization module 201 may generate a daily usage line (e.g., averaged electricity usage at any moment of a day during the pattern identification stage) for an appliance based on the data gathered over 1 month, 3 months, 6 months, 12 months, etc. FIG. 3 illustrates an example plot containing three example power usage patterns identified for three appliances. The X-axis of the plot indicates a day that starts from 12 am to 12 pm (a full 24 hour period), the top part of the Y-axis (e.g., +Y) indicates the power produced by a solar panel, and the bottom part of the Y-axis (e.g., −Y) indicates the power usage consumed by different appliances. It is to be noted that the power production pattern and power usage patterns in FIG. 3 are not scaled in the Y-axis, but rather reflect an overall pattern during a typical day. For example, the actual power production may be multiple times (e.g., 5 times, 10 times, 15 times, etc.) of power usage of an appliance. In addition, the different patterns illustrated in FIG. 3 are for exemplary purposes, and the actual daily patterns in a specific day may be different from those patterns illustrated in FIG. 3.

As can be seen, line 301 indicates that the corresponding appliance uses less power during the daytime and more power during nighttime. Line 302 indicates that the corresponding appliance uses more power during meal times (such as morning, noon, and evening). Line 303 indicates that the corresponding appliance uses more power during morning hours and evening hours. It can be seen that the line 302 is considered peakier than the other two lines 301 and 303, which indicates that one or more brief periods of very high demand of power are possible for the corresponding appliance(s). When such high demand for power passes over the limitation of the power supply during these periods, if there is no battery module as disclosed herein, the performance of the corresponding appliance may be limited (e.g., a longer cooking time than desired, a lower cooking temperature than expected, etc.). However, in the present disclosure, due to the integration of the battery module, the integrated battery actually makes the appliance more performant than would otherwise be possible. That is, the integrated battery can act as a buffer for peak power to ensure that there is enough power supply for the appliance when there is a power requirement that passes over the limitation of the existing power supply provided by the grid/electrical infrastructure.

In some implementations, such patterns may be identified for all connected appliances (e.g., appliances directly coupled to or indirectly connected to battery modules) in a residential unit. Based on such information, it can be predicted which appliance will likely use how much power at any moment of the day. In some implementations, the power production pattern(s) may be similarly identified. FIG. 3 further illustrates a power production pattern corresponding to a solar panel, indicated by line 304. From the peaks in line 304, it can be seen that the production of solar energy peaks around solar noon and reduces during dark periods such as a night or with cloud cover. From the power production and power usage patterns shown in FIG. 3, it can be seen that the supply of solar energy is very high during the mid-day period, whereas the demand for energy is high during the evening and morning periods when users are in their residences.

In some implementations, there may be more than one pattern identified for an appliance or power source such as a solar panel. For example, for an appliance, the power usage pattern may include a weekday pattern, a weekend pattern, a spring pattern, a summer pattern, a full pattern, a winter pattern, a sunny day pattern in winter, a snow day pattern in winter, etc. Each pattern may show some variations when compared to others. Similarly, for a power source such as a solar panel, it may also include a sunny day pattern, a cloudy day pattern, a spring pattern, a summer pattern, a fall pattern, a winter pattern, a sunny day pattern in winter, a snow day pattern in winter, etc. In some implementations, not every pattern is generated based on the data collection.

Instead, a machine learning model may infer a pattern based on other available patterns and by considering additional information. For example, a cloud day pattern in summer for a solar pattern may be generated based on a sunny day pattern in summer and further based on how much cloud is in a cloud day (which may be obtained based on the weather forecast information).

Energy distribution decision module 205 may be configured to determine a charge or discharge schedule for the battery modules within residential units based on the identified power production and power usage patterns. For example, the energy distribution decision module 205 may predict the power usage for a day based on the identified patterns, and then manage the charge and discharge of a battery module based on the prediction. For example, a charge and discharge schedule may ensure energy is purchased for storage when the supply exceeds the demand, or the price is relatively low or negative, which can back feed and use at a time when the demand exceeds the supply, or the price is relatively high or positive. Specifically, the energy distribution decision module 205 may determine to purchase energy to charge a battery module during the period of peak solar availability, which is also the period of low or negative pricing, and discharge during the peak demand periods, which are also the periods of peak or positive pricing. Additional charge from an AC grid source may be performed during periods of low demand, such as in the middle of the night.

It is to be noted that while the above-described battery charge or discharge may generally work well for most days and/or most families, under certain circumstances, there may be certain power usage changes and/or certain power production changes for a specific family and/or for a specific day. For example, if a family is out on vacation, the discharge may become unnecessary. Accordingly, in some implementations, the intelligent energy management application 105 may additionally include a contextual information collection module 205 configured to collect contextual information related to the power usage of an appliance at a specific situation for a specific family and/or a specific day) as well as power production-related information.

For example, the contextual information collection module 205 may receive calendar and travel information for family members from a third party service (e.g., Google Calendar®, check-in alert from email, etc.), and identify that the family members will be out for vacation in one day. This information may be then forwarded to the dynamic adjustment module 207 to adjust a charge and/or discharge plan for the battery module(s) on that day. For another example, the contextual information collection module 205 may receive a weather forecast indicating it will be cloudy in a day. This information may cause the dynamic adjustment module 207 to charge from a grid structure but not from a solar panel during the daytime. In another example, if the contextual information collection module 205 obtains information indicating that the family will go out for dinner, the dynamic adjustment module 207 may determine not to charge a battery module embedded in a cooktop. In some implementations, the dynamic adjustment module 207 may also include dynamically adjusting the charge level of a modular battery. For example, if there is a predicted heavy cloud and/or rain in a day, the dynamic adjustment module 207 may adjust the charge of a battery module for an air conditioner much less than planned, since it may be not necessary to turn on the air conditioner during that day. In addition, there may be also less power produced by the solar panel. By minimizing the charge of the battery module for the air conditioner, battery modules for other appliances may get the necessary charge from the solar panel during the daytime.

In some implementations, if there are multiple battery modules connected to form a battery network within a residential unit or between residential units within a building or facility, or small community, the redistribution of electricity can be also performed across or between appliances (and other electricity-powered units) during periods of low demand, so as to synchronize and redistribute stored power between storage batteries for the discharge periods. For example, consider the case of battery modules that are used for cooking during the evening, which become partially discharged after use early in the evening. Those battery modules may be embedded within appliances, such as a cooktop or oven. Those battery modules may also be connected to the battery network and thus can provide electricity later in the evening for use in other non-kitchen uses, such as water heating for a bath or the like. After the evening demand period ends, the battery modules for the kitchen appliances may be then recharged, either by the charge from the grid/electrical infrastructure (e.g., also referred to as grid power, fixed power, fixed alternating current, solar, or locally-generated power) or through redistribution from other appliances (or standalone battery modules) in idle, so that the battery modules of the kitchen appliances are recharged by the time when there is demand for use in the morning, e.g., for cooking breakfast. This recharge approach can be applied within residential units, as well as across residential units, across buildings, and across zones or systems, to optimize the charge and discharge of the battery modules.

Accordingly, in some implementations, the intelligent energy management application 105 may additionally include a battery aggregation module 209 and a stored energy redistribution module 211. The battery aggregation module 209 may be configured to aggregate information on remaining power levels for each battery module in a battery network, and also aggregate the predicted usage for the coming hours of the day for the appliance(s) coupled to each battery module. By collecting all this information, the energy redistribution module 211 may then determine whether to redistribute stored energy in a battery module to another different battery module and/or different appliances within the same resident unit or across different residential units, different buildings, different zones, and the like. In this way, since there is a large pool of battery modules that can be shared between different appliances, it may further improve the stability of the battery modules and improve the efficiency of battery modules in controlling peak power consumption, reducing high transient energy pricing, and/or dealing with power outages.

It is to be noted that the above-described modules for an intelligent energy management application are for illustrative purposes. In some implementations, an intelligent energy management application may include additional components and/or functions not described above. For example, there may be an additional machine learning engine that assists with a decision-making process, especially when making an instant decision based on the collected contextual information and/or aggregated information. For example, based on contextual information, a machine learning model may predict when a specific user in a family will take a shower, how long the shower will last, and what the temperature of the water will be used in the shower. Based on this information, the machine learning model may predict how much power should be provided to an electricity-powered water heater to ensure there is proper hot water ready for the user to take a shower. The functions and components of an intelligent energy management application are further described in detail below with reference to a battery module coupled to the appliance(s) and multiple battery modules within a battery network.

Intelligent Energy Management of a Single Battery Module

Figure 4:
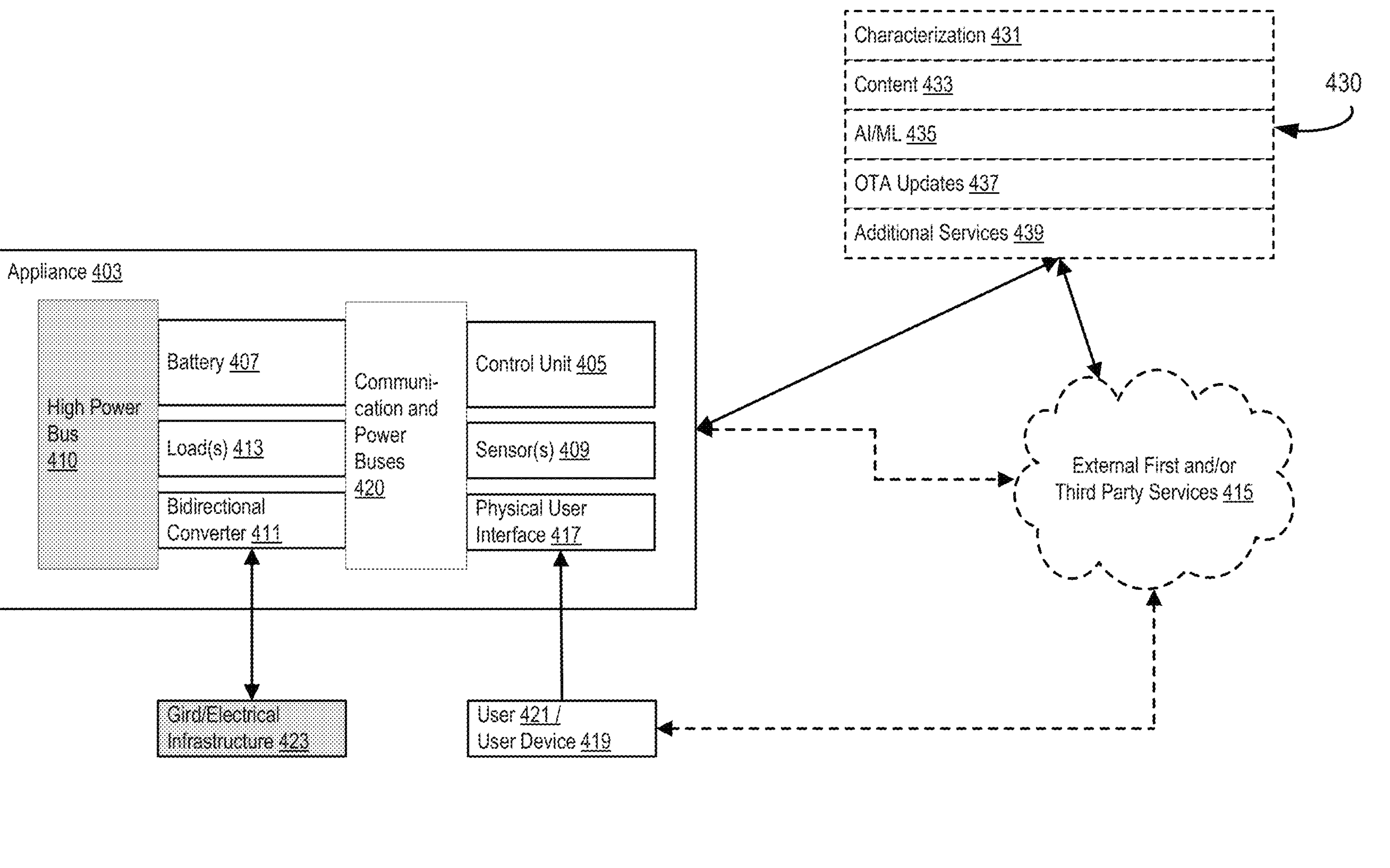
FIG. 4 illustrates a block diagram of an exemplary architecture of an appliance equipped with a battery module, according to some implementations.

FIG. 4 illustrates an example appliance equipped with a battery module, according to some implementations. As illustrated, appliance 403 is equipped with a battery module 407, which may be integrated into the appliance. The appliance can be a home appliance such as a kitchen appliance or any possible appliance. The battery 407 is coupled, via a bidirectional connection, to both power source (e.g., grid/electrical infrastructure 423) and sink energy (e.g., load(s) 413) by way of a single or multiphase bidirectional inverter 411. The power source may be provided from the existing electrical infrastructure of the building or set of buildings.

A high power bus 410 is provided between the power source/load(s) and the bidirectional converter 411, which converts from AC to DC in the direction from the power source 423 to the battery 407, and from DC to AC in the direction from the battery 407 to the power source 423. The high power bus 410 may also connect to the battery 407, bidirectional converter 411, and high peak load(s) 413. Additionally, a control unit 405 (embodied by an intelligent energy management application and hardware associated therein) may be provided with a sensor(s) 409 and switches at various positions, such as at the bidirectional converter 411 and the battery module 407, as well as at the peak load(s) 413, or near the peak load(s) 413. For example, sensor(s) 409 may be positioned inside or outside appliance 403. Where the sensors are positioned inside the appliance, these sensors may include built-in sensors (e.g., for a temperature controller built into a stovetop or range, an infrared and/or contact sensor may be built into the appliance).

In some implementations, the control unit 405 may provide a user with a physical user interface 417 such as manual controls. Additionally or alternatively, the control unit 405 may automatically control the battery charge and discharge by use of deterministic processes, and/or machine learning or artificial intelligence-based prediction models, to distribute the power to the peak load(s) 413. In some implementations, the control unit 405 may provide both peak power or average power, where the peak power can provide a rapid and high peak of power for the peak load(s) 413. In some implementations, the control unit 405 may be also configured to augment or boost battery performance by certain existing means. As illustrated, the control unit 405 may communicate with different components (e.g., components 407, 409, 411, 413, and 417 in FIG. 4) through communication and power buses 420, where the power bus may be a normal power bus (i.e. at voltages and currents typical of those to power embedded electronic devices).

In some implementations, appliance 403 may be coupled to a data storage unit 430. The data storage unit 430 may be a local or remote data storage unit and may be configured to store data generated by the intelligent energy management application and/or data collected from other sources, e.g., from third party services. For example, the data stored in the data storage unit 430 may include, but are not limited to, characterization 431, content 433, AI/ML 435, over-the-air (OTA) updates 437, and additional services 419.

The characterization 431 data may include data related to the power usage pattern generated for appliance 403 or load(s) 413 and the power supply pattern generated for the battery module. Content 433 may include contextual information that may affect the power usage of the appliance and power supply for the battery module. Such information may include weather information, user schedule information, user preference, user age or health condition, or any other information that may affect the power usage of the appliance and power supply of the battery module. In some implementations, the content 433 may also include different ways of use of appliances. For example, for cookware, the content 433 may include recipes, cooking instructions, and other types of content related to the type of cooking and/or cookware being used. For example, for a recipe that requires the use of a wok, the content may include instructions or commands for controlling the power supplied to the wok or limiting the wok accordingly (e.g., limiting peak power to keep from burning food). In some implementations, the content 433 may additionally include information related to the limitations of power supply and energy requirements of the appliances. It is to be noted that the content 433 described above is not inclusive, and certain other information may be also included in the content 433.

AI/ML 435 may include machine learning model(s) pre-trained prior to deployment to the control unit 405 or the intelligent energy management application. The AI/ML 435 may also include data related to the training of the machine learning models and partially trained models or completely trained models not deployed to the control unit 405 or the intelligent energy management application. In some implementations, the AI/ML 435 may additionally include algorithms or applications used for training the machine learning models. The OTA updates 437 may include any information received over the air, which may include instructions received from a user through a mobile device to manually set up or adjust a charge or discharge schedule of the battery module at any time point. The OTA updates 437 may also include other information received over the air. For example, the user may also provide information about food stored in a refrigerator or a recipe that the user is using in cooking, a washing cycle selected by the user, and so on. In some implementations, the OTA updates may actually include software or firmware updates that make changes to any of the aforementioned modules or modules described later. The additional services 439 may include certain notification services, alert services, information display or delivery, and any other service related to energy management.

It is to be noted that, in some implementations, there may be multiple appliances directly coupled to a single battery module. When there are multiple loads within a commercial, industrial or residential unit or across multiple units, the control unit 405 may provide for time-shifting and management of resources, such that the load or power may be shared within the commercial, industrial or residential unit units or across units. In some implementations, multiple battery modules are shared within these units instead. The application of energy sharing is further described in detail below.

Stored Energy Sharing

Figure 5:
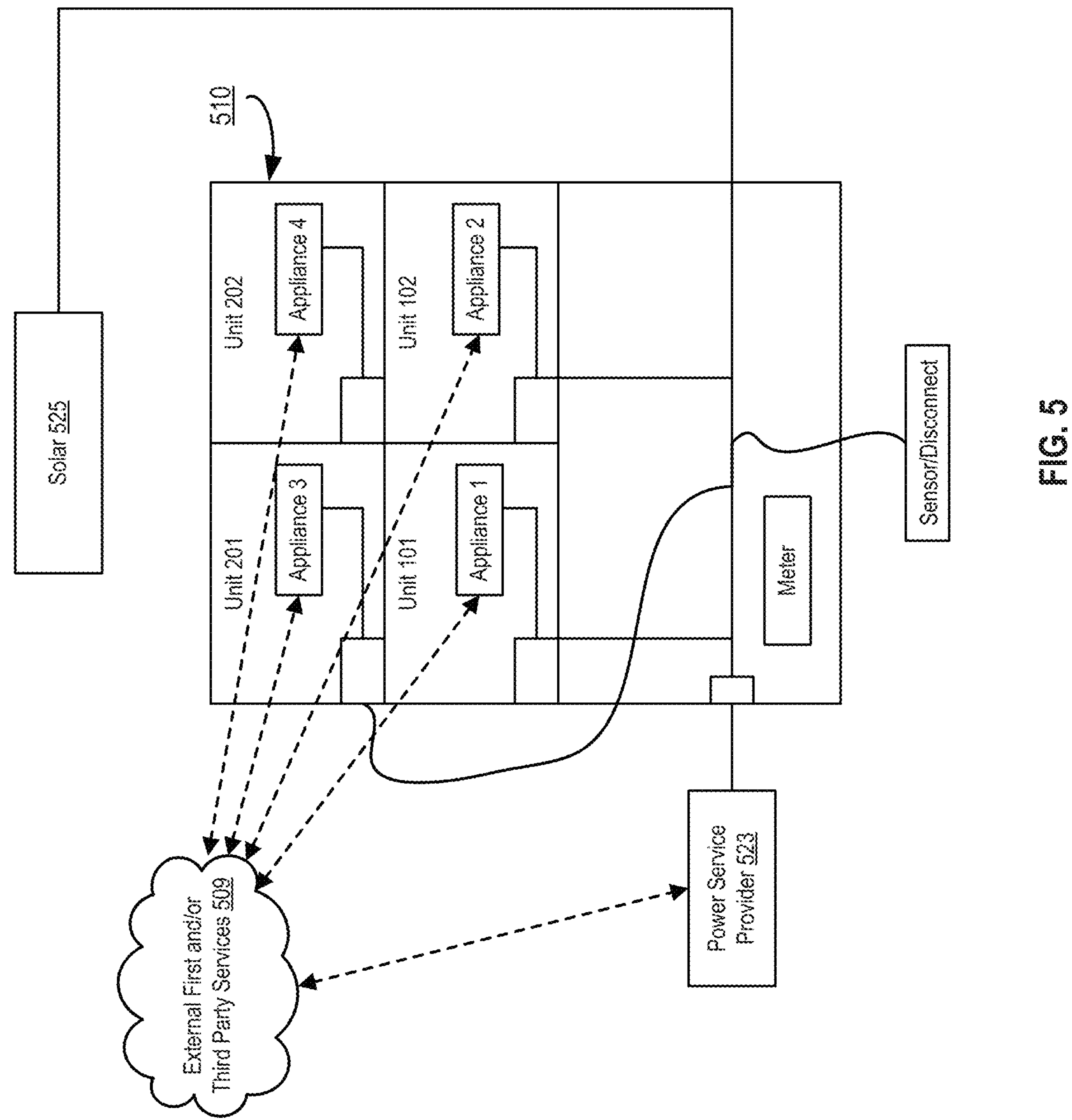
FIG. 5 illustrates a block diagram of an exemplary application scenario for energy sharing among different resident units within a building, according to some implementations.

FIG. 5 illustrates an example application scenario for sharing stored energy within an apartment building 510, according to some implementations. As illustrated, the example apartment building 510 includes four individual apartment units: unit 101, unit 102, unit 201, and unit 202. Each of the apartment units may have a number of appliances (only one appliance is shown in each apartment unit in FIG. 5) that have specific peak loads. Among these apartment units, at least two apartment units include one or more battery modules coupled to appliances in each apartment unit. Among the at least two apartment units, at least one apartment unit may include two or more battery modules within the apartment unit. In some implementations, the battery modules and the appliances connected to these battery modules in these apartment units form a battery network. Accordingly, the apartment building 510 may allow sharing of energy stored in batteries among different appliances within the same apartment unit or between different apartment units. As described earlier, the power input for the apartment building may be provided by a power service provider (e.g., PG&E®) 523 and by a solar panel 525. Electrical energy can be distributed by way of the existing circuits and infrastructure to each of the apartment units, including to the connected battery modules (e.g., through bidirectional converters) and/or the appliances. At each apartment unit, a unit-level circuit panel may be provided, and on one of the circuits, there are one or more connected appliances. When there is a coupled battery, an appliance may additionally include a bidirectional converter, power bus, sensors(s), control unit, and/or user interface as described earlier in FIG. 4.

Under certain circumstances, to improve energy usage efficiency, it might be beneficial to share energy stored within a battery module among different appliances or apartment units with a battery network. For example, if one apartment unit (e.g., unit 101) is not in use, such as the residents of the apartment unit are out of town, the stored energy in the battery module(s) of the appliance(s) within that apartment unit may be redistributed to other connected units during periods of peak power consumption, high transient energy pricing, and/or during power outages. Thus, short-term redundant emergency-use electrical power can be provided at the building level. Similarly, within an apartment unit itself, a battery module may provide backup power for another appliance during periods of peak power consumption, high transient energy pricing, and/or during power outages. As a result, the apartment building may be able to manage the usage of electricity in the context of electricity pricing or emergency situations.

In some implementations, to allow sharing the stored energy, a control unit for an appliance (also referred to as an appliance-specific control unit) may be coordinated (e.g., through communication and/or power buses) with other control units for other appliances within the same apartment unit or between different apartment units in the apartment building 401. At this point, the appliance-specific control units may be implemented in a primary/secondary mode, with one of the appliance-specific control units serving as the primary control unit, while all other appliance-specific control units serve as secondary control units and listen to this primary control unit. Alternatively or additionally, there may be a specifically configured central control unit (e.g., a control unit residing in an external first and/or third party services 509 in FIG. 5) that controls all appliance-specific control units.

In some implementations, the central control unit or primary control unit may be configured to monitor the instantaneous power usage of connected appliances and the remaining power levels in the connected battery modules. The central control unit or primary control unit may redistribute the stored energy in the connected battery modules based on demand. For example, if residents in apartment unit 101 are out of town, the energy stored in the battery module(s) in apartment unit 101 may be redistributed to other apartment units if these apartment units are short of power stored in the battery modules for high peak loads.

Under certain circumstances, e.g., when there is a power outage, there is a shortage of stored energy among all appliances and/or apartment units. At this moment, the central control unit or primary control may redistribute the stored energy based on priority. Accordingly, in some implementations, a central control unit or primary control unit may additionally include a priority determination module configured to determine the power usage priority for appliances within an apartment unit and/or within a building.

In some implementations, the priority determination module in the central control unit or primary control unit may determine the priority of each appliance based on the general function of each appliance. For example, the priority determination module may determine that a refrigerator generally has a higher priority since foods stored in a refrigerator may become spoiled if a refrigerator loses power for too long. Similarly, the priority for a water heater may be lower than a refrigerator but higher than other appliances such as a clothes dryer or dishwasher. In this way, the priority determination module may rank the appliances included in an apartment unit and/or a whole building based on the determined priority of each appliance.

In some implementations, the priority determination module may also determine a priority at the apartment unit level. That is, the priority determination module may determine some apartment units within an apartment building have a higher priority than other units. For example, if an apartment unit has an elder person that generally requires more intense care, the apartment unit may have a higher priority than other apartment units. In case of a power outage, the stored power may be first provided to this unit to ensure this apartment unit has the necessary power. In one example, if the elder person in that apartment unit uses an electricity-powered medical support device, it can be ensured that the medical support device will not immediately lose power through priority-based energy sharing. In another example, the priority determination module may determine that an apartment unit may have a new-born baby, and thus determine to enhance the priority of that apartment unit, to ensure the room temperature is stable at that apartment unit.

In some implementations, the disclosed intelligent power management system may include one or more sensors configured to monitor the apartment units in an apartment building in determining the appliance-level and/or apartment unit-level priority. In one example, the intelligent power management system disclosed herein may include an audio sensor to detect voices from an apartment unit to determine whether there is a new-born baby (e.g., from a baby crying voice) or an elder person (e.g., from frequent cough). In some implementations, a machine learning model trained for voice recognition may be included in the audio sensor or in the intelligent power management system, so as to provide necessary information for determining the priority.

In some implementations, the information obtained from the sensors may also allow to further adjust the priority of certain appliances and/or apartment units. In one example, the intelligent power management system disclosed herein may include a video sensor coupled to a stove to monitor a cooking process and determine whether an enhanced power supply should be instantly provided to the stove according to a recipe (or certain other protocols). At this point, the priority for a stove can be instantly increased. In another example, a video sensor coupled to the inside of a refrigerator may determine the types of food stored in the refrigerator. In general, some types of food such as vegetables may be more temperature-sensitive than other types of food such as eggs. Accordingly, if a video sensor detects that there is barely any temperature-sensitive food stored inside a refrigerator, the priority of the refrigerator can be downgraded to a much lower level based on the information obtained from the video sensor.

In some implementations, based on the determined priority at the appliance level and/or at the apartment unit level, the central control unit or primary control unit may determine how to distribute the stored power among different appliances with the same apartment unit or among different apartment units when multiple appliances and/or apartment units need power supply at about the same time and when there is not enough power supply for all these needs. In general, a higher priority appliance or apartment unit gets a higher priority in power redistribution when many appliances or apartment units need a power supply at the same time (e.g., when there is a power outage). For example, for an appliance or apparatus that has an extremely high priority (e.g., a medical support device), the central control unit and primary control unit may reserve the energy stored by the battery modules in the battery network to ensure that there is enough power to run that appliance or device for at least a certain time period (e.g., 1 hour, 2 hours, 4 hours, 8 hours, 16 hours, 24 hours, etc.). This can ensure a limited amount of stored energy is properly used to increase the efficiency of the energy stored by the battery modules.

Implementations

Figure 6:
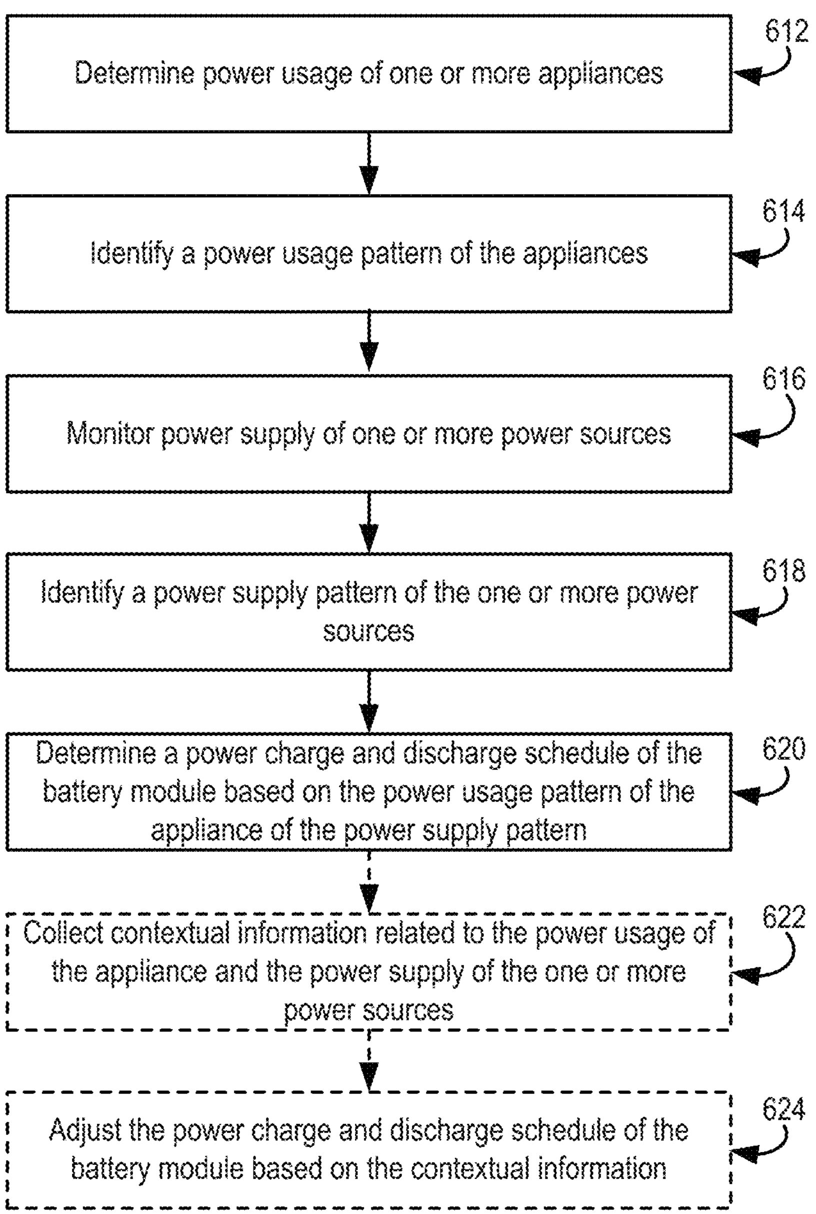
FIG. 6 is a flow chart of an example method for intelligent energy management, according to some implementations.
Figure 7:
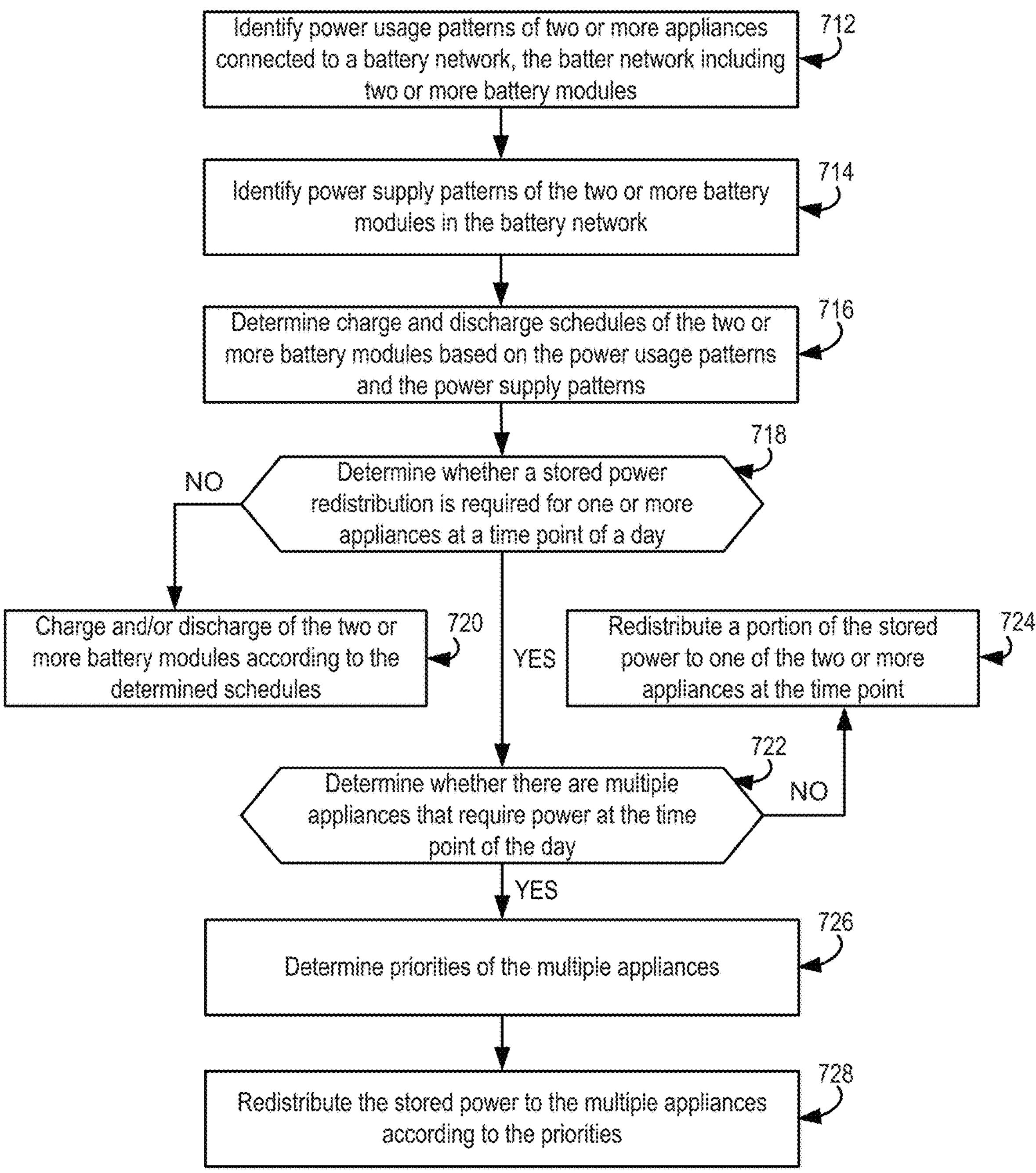
FIG. 7 is a flow chart of another example method for intelligent energy management, according to some implementations.

The disclosed implementations additionally include some methods for intelligent energy management for appliances equipped with battery modules. FIG. 6 illustrates an example method for the management of a single battery module, and FIG. 7 illustrates an example method for the management of multiple battery modules, according to some implementations.

The example method 600 is illustrated with reference to an application scenario where a single appliance (or multiple appliances) is connected to a single battery module. In step 612, the power usage of an appliance coupled to a battery module is first monitored. This includes monitoring the power usage of the appliance for a certain period of time (e.g., 1 month, 3 months, 6 months, 12 months, etc.). In step 614, a power usage pattern of the appliance connected to the battery module is identified. The power usage pattern may include a single pattern or may include a set of patterns, such as weekday pattern, weekday pattern, season pattern, etc. Method 600 further monitors the power supply of one or more power sources in step 616. For example, power availability or cost from a solar panel or the grid may fluctuate throughout the day. For another example, the power supply from a solar panel may be peaked at around noon time. In step 618, a power supply pattern of the one or more power sources for the battery module is identified. Similar to the power usage pattern, the power supply pattern may also include a set of patterns, such as season patterns, cloudy day patterns, sunny day patterns, etc. In step 620, a power charge and discharge schedule is determined for the battery module based on the identified power usage pattern of the appliance and the power supply pattern of the one or more power sources supplying power to the battery module. In one example, if a day is a weekend in summer, a weekend summer pattern for the appliance and/or power sources can be used to determine the schedule for charging and discharging the battery module.

In some implementations, the determined charge and discharge schedule for the battery module can be dynamically adjusted for a specific day and time, since not every day is the same. Accordingly, method 600 may further include step 622 which collects contextual information related to the power usage of the appliance and the power supply of the one or more power sources that may affect the battery module charging and/or discharging. For example, a regular dinner is canceled due to a busy schedule, which then affects the power usage of a cooktop. The power discharge to the cooktop by a battery module coupled to the cooktop can be then changed. In step 624, the power charge and/or discharge schedule can be then dynamically adjusted based on the contextual information related to the power usage of the appliance and/or the power supply of the one or more power sources.

Although not specifically illustrated in FIG. 6, in some implementations, the battery module illustrated in FIG. 6 can be applied to multiple appliances. Namely, there are two or more appliances connected to the same battery module, and thus the battery module may discharge to the two or more appliances within a certain period. For example, based on the demand, a battery module may provide electricity to a cooktop at 5:45-6:30 pm and then provide electricity to an electricity-powered water heater at 8:30-9:30 pm during the day. In some implementations, if there are two connected appliances that require power at the same time and the battery module may not provide electricity to the two appliances simultaneously, the battery module may provide electricity to an appliance with a higher priority. In some implementations, if a battery module is embedded into an appliance, the appliance may have a higher priority than other appliances connected to the battery module. In some implementations, the priority can be determined through other different means as described earlier. For example, if an appliance has a peak power draw that is so high that it is actually impermissible to run on any kind of existing approved home infrastructure, the appliance may have a higher priority than other appliances. For example, the power usage pattern for that appliance may be determined, and the power charge and discharge schedule may be then determined and/or dynamically adjusted based on the power usage pattern for that appliance, to ensure that the appliance operates properly. In this way, the disclosed system can actually unlock the appliance requirements to allow certain impermissible appliances (e.g., appliances that are impermissible to run on an existing home infrastructure without a battery module disclosed herein) to be installed at a home infrastructure.

The example method 700 further illustrates an example scenario where multiple battery modules are shared among different appliances and/or different resident units. Method 700 starts by identifying the power usage patterns of two or more appliances connected to a battery network in step 712 and identifying the power supply patterns of two or more battery modules in the battery network in step 714. The battery network includes two or more battery modules that can be charged and/or discharged. In some implementations, the battery network may refer to all battery modules, all appliances connected to the battery modules, and other accessory components such as sensors, control units, bidirectional converter, peak loads, etc. The power usage pattern for each appliance and power supply pattern for each battery module may be determined according to the approaches described earlier (e.g., as described in FIG. 6). In step 716, the charge and discharge schedules for the two or more battery modules in the battery network are determined based on the power usage patterns and the power supply patterns. In some implementations, the determined charge and discharged schedules may be also dynamically adjusted according to the contextual information for a specific time point of a specific day related to each specific appliance, as described earlier (e.g., as described in FIG. 6).

In step 718, method 700 may further determine whether there is a stored power redistribution required for one or more appliances at one time point of the day. The stored power may refer to a sum of the remaining power stored in all battery modules within the battery network. In some implementations, the instantaneous charge level for each battery module in the battery network can be respectively determined, and thus the total available power within the battery network may be determined accordingly. To determine whether a stored power redistribution is required, method 700 may check whether there is still power remaining in the battery network when a battery module directly coupled to the appliance does not have power left or does not have enough power to supply an expected power usage of the appliance. Here, a battery module directly coupled to an appliance is a battery module that is disposed inside or outside the appliance and is mainly used for providing power to the appliance. In step 720, when it is determined that there is no stored power redistribution necessary, the battery modules included in the battery network may be charged and/or discharged according to the determined schedules in step 716.

On the other hand, when it is determined that redistribution is required for one or more appliances, in step 722, method 700 further determines if there is more than one appliance that requires power redistribution in step 722. If there is only one appliance that requires a power redistribution, the stored power in the battery network is redistributed to the appliance that requires the power redistribution in step 724. The power may be redistributed from a battery module that has the highest power remaining, with or without taking into consideration the necessary power supply required to power the directly coupled appliance(s) of the battery module before a scheduled next battery charge. In some implementations, a battery module is preferably selected from the same residential unit. When it is determined that the redistribution is required for more than one appliance at a time point of a day, method 700 may further determine a priority of the two or more appliances that require power redistribution in step 726. One of the appliances may have a higher than another and thus may be more likely to have power redistributed to it. In some implementations, the priority may be also determined at a resident unit level. If an appliance from a resident unit has a higher priority, even though the appliance itself may have a lower priority, the appliance may still be more likely to get a power redistribution than another appliance that has a higher priority but from a residential unit that has a lower priority.

In some implementations, a machine learning model or other algorithms may be further employed to predict which appliance should have a higher priority at any time point by taking into consideration of the changing situations, so as to make sure the power is properly redistributed at a single time point. This then improves the efficiency of the power usage for the power stored in the battery network.

ADDITIONAL CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component.

Similarly, structures and functionality presented as a single component may be implemented as separate components. These and other variations, modifications, additions, and improvements fall within the scope of the subject matter herein.

Certain implementations are described herein as including logic or a number of components, modules, or mechanisms, for example, as illustrated and described in the figures above. Modules may constitute either software modules (e.g., code embodied on a machine-readable medium) or hardware modules. A hardware module is a tangible unit capable of performing certain operations and may be configured or arranged in a certain manner. In example implementations, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various implementations, a hardware module may be implemented mechanically or electronically. For example, a hardware module may include dedicated circuitry or logic that is permanently configured (e.g., as a special-purpose processor, such as a field-programmable gate array (FPGA) or an application-specific integrated circuit (ASIC)) to perform certain operations. A hardware module may also include programmable logic or circuitry (e.g., as encompassed within a general-purpose processor or other programmable processors) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example implementations, include processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain operations may be distributed among the one or more processors, not only residing within a single machine, but deployed across a number of machines. In some example implementations, the one or more processors or processor-implemented modules may be located in a single geographic location (e.g., within a home environment, an office environment, or a server farm). In other example implementations, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one implementation" or "an implementation" means that a particular element, feature, structure, or characteristic described in connection with the implementation is included in at least one implementation. The appearances of the phrase "in one implementation" in various places in the specification are not necessarily all referring to the same implementation.

Some implementations may be described using the expression "coupled" and "connected" along with their derivatives. For example, some implementations may be described using the term "coupled" to indicate that two or more elements are in direct physical or electrical contact. The term "coupled," however, may also mean that two or more elements are not in direct contact with each other, but yet still co-operate or interact with each other. The implementations are not limited in this context.

As used herein, the terms "comprises," "comprising," "includes," "including," "has," "having" or any other variation thereof, are intended to cover a non-exclusive inclusion. For example, a process, method, article, or apparatus that includes a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). In addition, "automatic" may involve fully automatic or semi-automatic implementations involving user or operator control over certain aspects of the implementation, depending on the desired implementation of a person of ordinary skill in the art practicing implementations of the present disclosure.

In addition, use of the "a" or "an" is employed to describe elements and components of the implementations herein. This is done merely for convenience and to give a general sense of the claimed invention. This description should be read to include one or at least one and the singular also includes the plural unless it is obvious that it is meant otherwise.

Further, sequential terminology, such as "first", "second", "third", etc., may be used in the description and claims simply for labeling purposes and should not be limited to referring to described actions or items occurring in the described sequence. Actions or items may be ordered into a different sequence or may be performed in parallel or dynamically, without departing from the scope of the present disclosure.

Upon reading this disclosure, those of skill in the art will appreciate still additional alternative structural and functional designs for the system described above. Thus, while particular implementations and applications have been illustrated and described, it is to be understood that the disclosed implementations are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A system for intelligent power management, comprising:

an appliance having a battery module and a heat transfer element, the battery module being configured to provide power to the heat transfer element;

a sensor coupled to the heat transfer element and not coupled to the battery module to monitor a temperature value of the heat transfer element at a specific time point; and a control unit communicatively coupled to the sensor to collect information obtained from the sensor, the control unit being configured to determine whether to adjust the power provided to the heat transfer element from the battery module based on the temperature value of the heat transfer element.

2. The system of claim 1, wherein the appliance is a stove and the sensor is a temperature sensor.

3. The system of claim 2, wherein the temperature sensor is configured to monitor a cooking process.

4. The system of claim 3, wherein:

the heat transfer element includes a stovetop burner, and the control unit is configured to determine whether to adjust the power provided to the stovetop burner of the stove from the battery module according to the cooking process and a predefined cooking protocol.

5. The system of claim 1, wherein the appliance is a refrigerator and the sensor is a temperature sensor.

6. The system of claim 5, wherein the temperature sensor is configured to detect a temperature sensitivity of food items stored in the refrigerator.

7. The system of claim 6, wherein the control unit is configured to determine whether to adjust the power provided to the heat transfer element of the refrigerator from the battery module according to the temperature sensitivity of the food items stored in the refrigerator.

8. The system of claim 1, wherein the control unit is further configured to determine a charge and discharge schedule for the battery module based on a power usage pattern of the heat transfer element.

9. The system of claim 8, further comprising one or more sensors or third party services coupled to the control unit and configured to collect contextual information related to one or more of the battery module or the appliance.

10. The system of claim 9, wherein the control unit further comprises a machine learning model trained to predict a usage of the appliance based on the collected contextual information.

11. The system of claim 10, wherein the control unit is further configured to adjust the determined charge and discharge schedule based on the predicted usage of the appliance by the trained machine learning model.

12. The system of claim 8, further comprising a physical user interface configured to receive a user input for manually editing the charge and discharge schedule for the battery module at a time point.

13. A method of intelligent power management, comprising:

monitoring a temperature value of a heat transfer element of an appliance at a specific time point, the temperature value being monitored by a sensor coupled to the heat transfer element of the appliance and not coupled to a battery module included in the appliance;

collecting power usage data of the appliance at the specific time point, wherein the power usage data indicates power provided to the heat transfer element of the appliance by the battery module included in the appliance; and determining whether to adjust the power provided to the heat transfer element of the appliance from the battery module based on the temperature value of the heat transfer element of the appliance and the power usage data of the appliance.

14. The method of claim 13, wherein the appliance is a stove and the sensor is a temperature sensor.

15. The method of claim 14, wherein the temperature sensor is configured to monitor a cooking process.

16. The method of claim 15, wherein:

the heat transfer element of the stove includes a stovetop burner, and determining whether to adjust the power provided to the heat transfer element of the appliance includes determining whether to adjust the power provided to the stovetop burner of the stove from the battery module according to the cooking process and a predefined cooking protocol.

17. The method of claim 13, wherein the appliance is a refrigerator and the sensor is a temperature sensor.

18. The method of claim 17, wherein the temperature sensor is configured to detect measure a temperature sensitivity of food items stored in the refrigerator.

19. The method of claim 18, wherein determining whether to adjust the power provided to the heat transfer element of the appliance includes determining whether to adjust the power provided to the heat transfer element of the refrigerator from the battery module according to the temperature sensitivity of the food items stored in the refrigerator.

20. The method of claim 13, further comprising:

determining a charge and discharge schedule for the battery module based on a power usage pattern of the heat transfer element of the appliance.

21. The system of claim 1, wherein the appliance is any one of an air conditioner, a water heater, a space heater, an electric range, a microwave, an oven, a dishwasher, or a clothing dryer.

22. The system of claim 11, wherein:

the appliance is an air conditioner, and the contextual information includes weather data.

23. The system of claim 11, wherein:

the appliance is an electric water heater, and the contextual information includes at least one of (1) a first set of times indicating usage of a shower, (2) a second set of times indicating usage of the shower by a specific user, (3) a set of time periods defining durations of usage of the shower, or (4) water temperature data associated with usage of the shower.

24. The system of claim 1, further comprising:

an audio sensor configured to detect a voice of a user of the appliance to produce audio data, the control unit being configured to use a machine learning model to identify text from the audio data, the machine learning model being trained for voice recognition, the control unit configured to modify an operation of the appliance based on the text.

25. The system of claim 1, further comprising:

an audio sensor configured to identify text from audio data, the audio data being representative of a voice of a user of the appliance, the control unit configured to modify an operation of the appliance, based on the text.

* * * * *